(12) United States Patent
Rivera et al.

(10) Patent No.: US 9,962,031 B2
(45) Date of Patent: May 8, 2018

(54) BREWING CHAMBER WITH DYNAMIC WATER DISPERSION

(71) Applicants: Adrian Rivera, Whittier, CA (US); Kenneth L. Green, La Habra Heights, CA (US)

(72) Inventors: Adrian Rivera, Whittier, CA (US); Kenneth L. Green, La Habra Heights, CA (US)

( * ) Notice: Subject to any disclaimer, the term of this patent is extended or adjusted under 35 U.S.C. 154(b) by 0 days. days.

(21) Appl. No.: 15/338,357

(22) Filed: Oct. 29, 2016

(65) Prior Publication Data

US 2017/0119197 A1 May 4, 2017

Related U.S. Application Data

(60) Provisional application No. 62/249,047, filed on Oct. 30, 2015.

(51) Int. Cl.
*A47J 31/06* (2006.01)
*A47J 31/44* (2006.01)

(52) U.S. Cl.
CPC ....... *A47J 31/0631* (2013.01); *A47J 31/4407* (2013.01)

(58) Field of Classification Search
CPC ................ A47J 31/0631; A47J 31/4407; A47J 31/4489; A47J 31/46; A47J 31/4485
USPC ................ 99/279, 282, 287, 295, 300, 323; 366/154.1, 169.2
See application file for complete search history.

(56) References Cited

U.S. PATENT DOCUMENTS

| 3,356,011 A | 12/1967 | Parraga |
| 3,824,913 A | 7/1974 | Herman et al. |
| 4,112,830 A * | 9/1978 | Saito ...................... A47J 31/002 99/300 |
| RE45,476 E | 4/2015 | Burrows et al. |
| 2011/0100228 A1* | 5/2011 | Rivera .................. A47J 31/446 99/281 |

FOREIGN PATENT DOCUMENTS

CN 103784016 A 5/2014

* cited by examiner

*Primary Examiner* — Dana Ross
*Assistant Examiner* — James Sims, III
(74) *Attorney, Agent, or Firm* — Kenneth L. Green; Averill & Green

(57) ABSTRACT

A brewing material holder includes a spinning assembly for uniformly dispersing water into brewing material. The spinning assembly may be attached to a removable holder lid or reside in the base of the holder. When water is pumped into the holder, the flow of water is sprayed into brewing material contained in the brewing chamber. On one embodiment, water is pumped into the brewing material holder, and the flow of water causes the spinning assembly to spin by the water flowing past gears or a propeller, or by tangential jets on the spinning member. In another embodiment, the coffee maker includes a rotating shaft engaging the brewing material holder to cause the spinning assembly to spin, or may include stator winding creating a rotating magnetic field in the brewing chamber to cause the spinning assembly to spin.

20 Claims, 9 Drawing Sheets

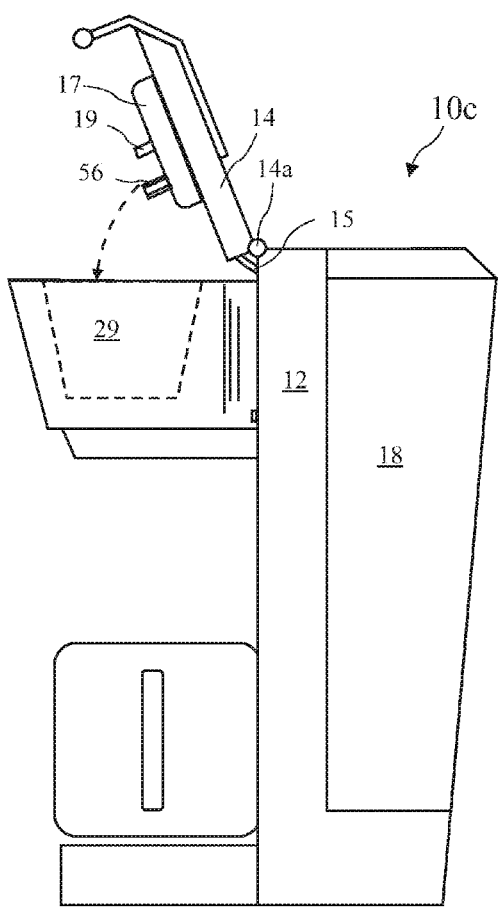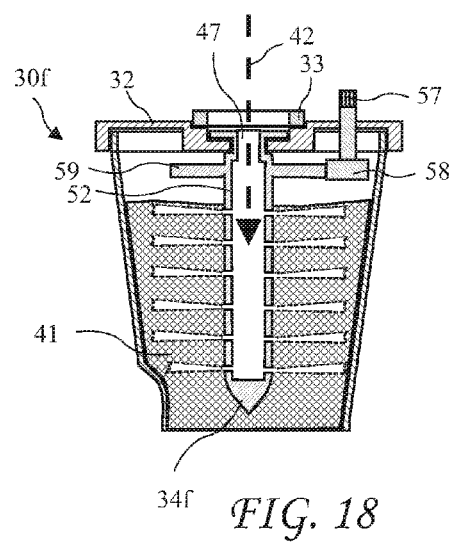
FIG. 17
FIG. 18

BREWING CHAMBER WITH DYNAMIC WATER DISPERSION

CROSS-REFERENCE TO RELATED APPLICATIONS

The present application claims the priority of U.S. Provisional Patent Application Ser. No. 62/249,047 filed Oct. 30, 2015, which application is incorporated in its entirety herein by reference.

BACKGROUND OF THE INVENTION

The present invention relates to beverage brewing and in particular to a rotating water dispersion into a brewing chamber.

Brewed beverages are often prepared by injecting water into a brewing chamber containing a brewing material such as ground coffee beans. Various configurations are known including inserting a needle into the brewing material, streams of water injected down into the brewing material. Unfortunately, water released or sprayed into the brewing material may form channels or packets, and the brewed beverage is not uniformly extracted from the brewing material.

BRIEF SUMMARY OF THE INVENTION

The present invention addresses the above and other needs by providing a brewing material holder including a spinning assembly for uniformly dispersing water into brewing material. The spinning assembly may be attached to a removable holder lid or reside in the base of the holder. When water is pumped into the holder, the flow of water is sprayed into brewing material contained in the brewing chamber. On one embodiment, water is pumped into the brewing material holder, and the flow of water causes the spinning assembly to spin by the water flowing past gears or a propeller, or by tangential jets on the spinning member. In another embodiment, the coffee maker includes a rotating shaft engaging the brewing material holder to cause the spinning assembly to spin, or may include stator winding creating a rotating magnetic field in the brewing chamber to cause the spinning assembly to spin.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1C is a top view of the coffee maker according to the present invention.

FIG. 17 shows a coffee maker including an offset rotating shaft engaging a brewing material holder according to the present invention.

FIG. 18 shows a cross-sectional view of a seventh brewing material holder including dynamic water dispersion according to the present invention having offset gears and a center column rotated by the coffee maker.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1A:
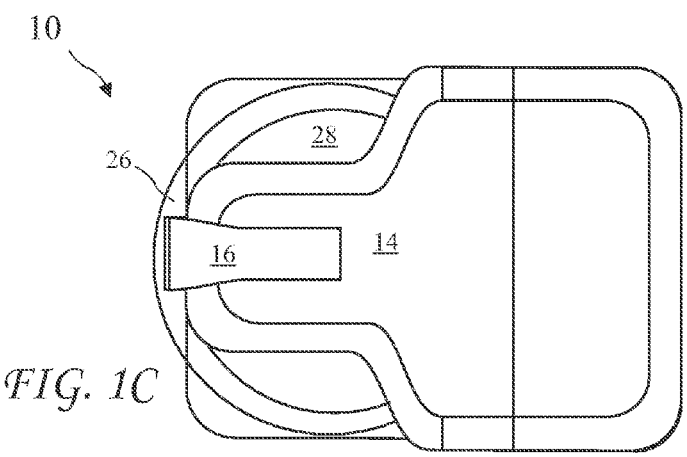
FIG. 1A is a front view of a coffee maker according to the present invention.
Figure 1B:
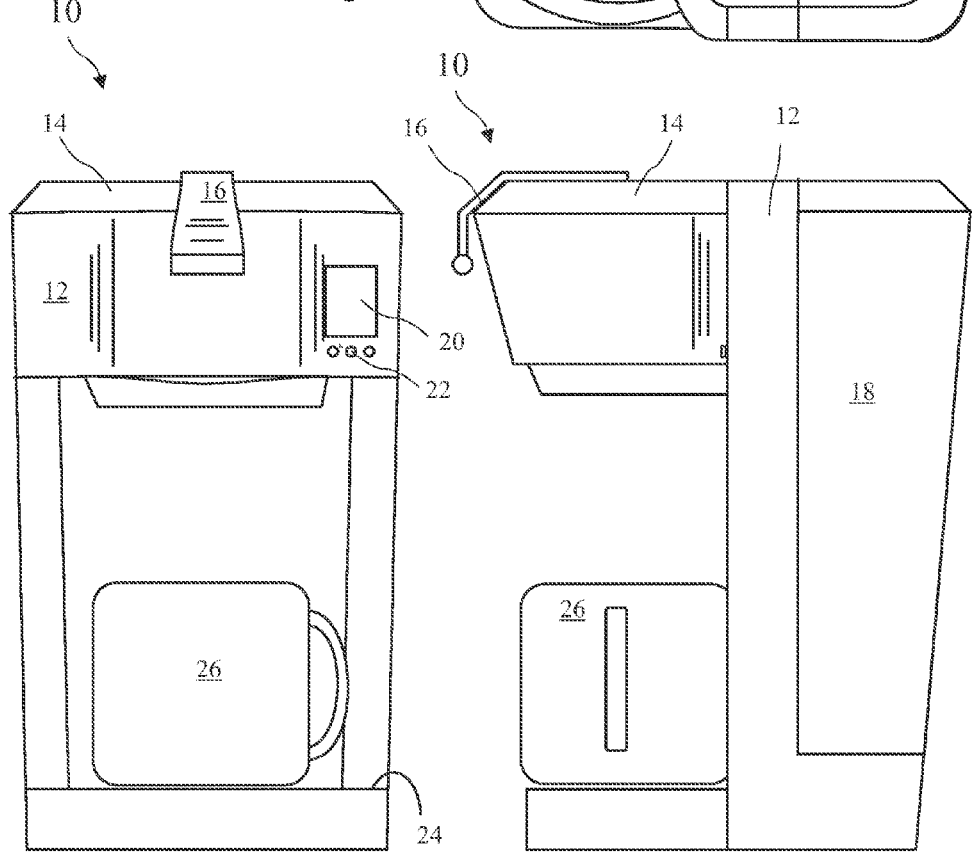
FIG. 1B is a side view of the coffee maker according to the present invention.

A front view of a coffee maker 10 according to the present invention is shown in FIG. 1A, a side view of the coffee maker 10 is shown in FIG. 1B, and a top view of the coffee maker 10 is shown in FIG. 1C. The coffee maker 10 includes a base 12, an opening lid 14, a lid handle 16, a water container 18, a display 20, controls 22, and platform 24. A cup 26 rests on the platform 24. The coffee maker 10 provides a flow of hot water through brewing material to produce a brewed drink. The flow of water may be heated by one of any known means, for example, an electrical heating coil, inductive heating, or a conductive coating on tubing carrying the water.

Figure 2A:
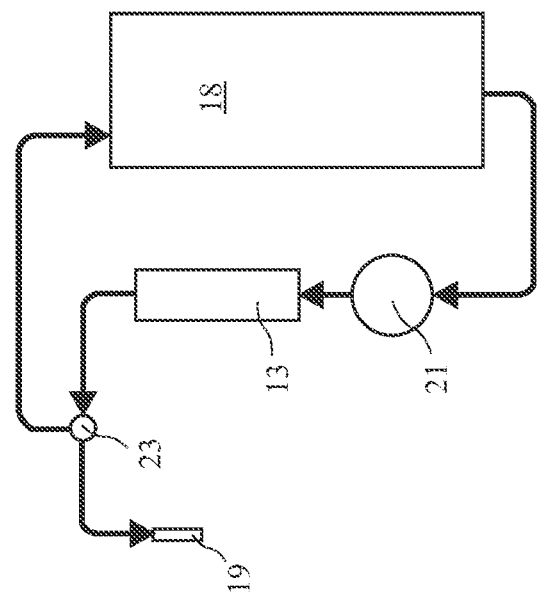
FIG. 2A is a functional diagram of the coffee maker.
Figure 2:
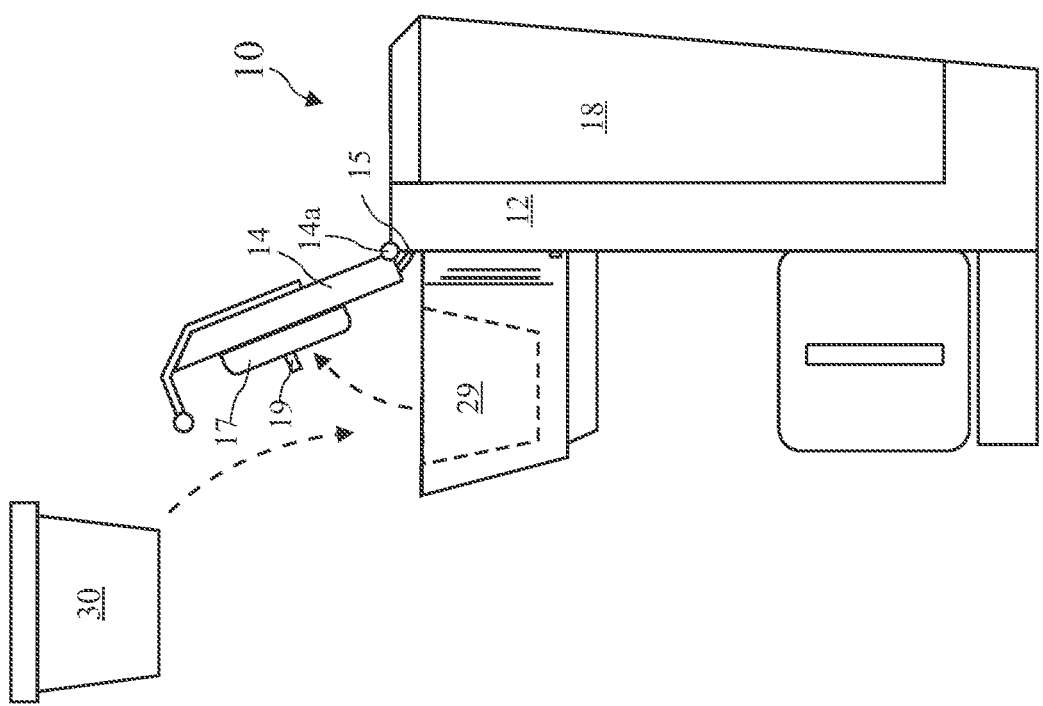
FIG. 2 is a side view of the coffee maker with an open lid allowing placement of a brewing material holder according to the present invention inside the coffee maker.

A side view of the coffee maker 10 with an open lid 14 allowing placement of a brewing material holder 30 according to the present invention inside a brewing chamber 29 of the coffee maker 10 is shown in FIG. 2. The lid 14 includes a lid hinge 14a and a water tube 15 carries heated water into the lid 14. A pad 17 may reside on a bottom surface of the lid 14 and press against the brewing material holder 30 when the lid 14 is closed, and in cooperation with other means to tamp coffee contained in the brewing material holder 30. A nozzle 19 extending down from the closed lid 14 directs the flow of hot water into the brewing material holder 30.

A functional diagram of the coffee maker 10 is shown in FIG. 2A. The preferred coffee (or brewing material) maker 10 includes the water tank 18, a water pump 21, a heater 13, check valve 23 and the nozzle 18. The pump 21 preferably provides at least one PSI water pressure. The water heater 13 may include a heating coil, inductive heating, or a resistive coating or any other means for heating water. The check valve 23 limits the water pressure at the nozzle 19 by returning some of the water flow back to the water tank 18. While the water pump 21 is a preferred method for providing a flow of water to the nozzle 19, other methods include placing the water in the water tank 18 under pressure, and a coffee maker using any means to provide a forced flow of water is intending to within the scope of the present invention.

Figure 3A:
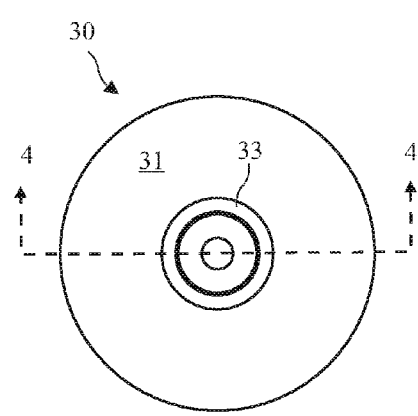
FIG. 3A is a top view of a brewing material holder including dynamic water dispersion according to the present invention.
Figure 3B:
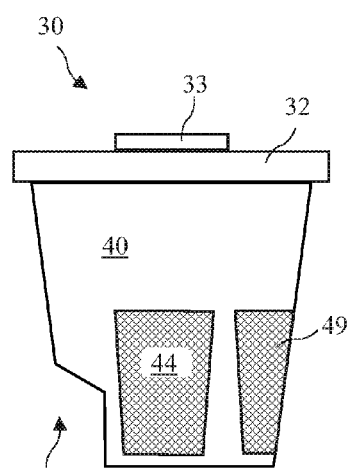
FIG. 3B is a side view of the brewing material holder including dynamic water dispersion according to the present invention.

A top view of a brewing material holder 30 including dynamic water dispersion according to the present invention is shown in FIG. 3A, and a side view of the brewing material holder 30 including dynamic water dispersion is shown in FIG. 3B. The brewing material holder 30 includes a removable lid 31 and a base 40. A sealing portion 33 may extend up from the lid 31 to seal to the coffee maker 10 (see FIG. 2) to contain the flow of water 42 under pressure to the brewing material holder 30. The holder 30 may be configured to allow use in coffee makers sold under the trademark KEURIG which include a top puncture needle for injecting pressurized water into a brewing cartridge, and a bottom puncture needle for puncturing sealed brewing cartridges to extract brewed beverage. Such coffee makers are described in U.S. Pat. No. 5,325,765, incorporated herein by reference in its entirety.

The pressurized flow of water 42 enters the brewing material holder 30 through a passage 47 in the lid 31. The passage 47 may be configured to accept the top puncture needle of the '765 patent. The base 40 may further include a bottom recess 45 to avoid the bottom needle disclosed in the '765 patent. The recess 45 may be into the side of the holder, or into the bottom of the holder. In other embodiment, an injection needle or an extraction needle may penetrate the cartridge from a side versus the top or bottom. The base 40 further includes mesh 44 (or the like) covered window 49 to retain the brewing material in the brewing material holder 30 during brewing, and release brewed drink from the brewing material holder 30.

Figure 4:
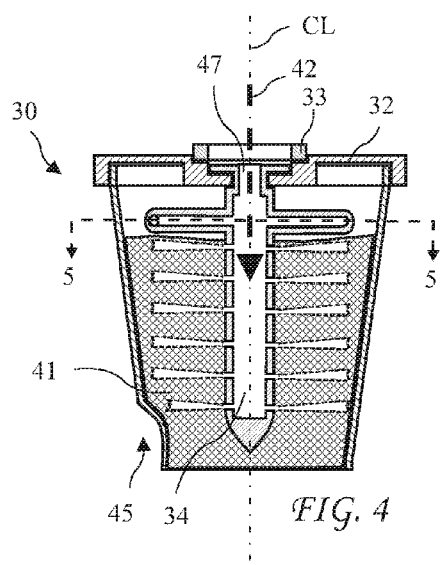
FIG. 4 is a cross-sectional view of the brewing material holder including dynamic water dispersion according to the present invention taken along line 4-4 of FIG. 3A.
Figure 5:
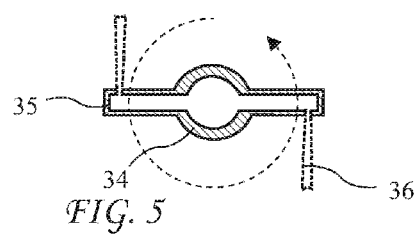
FIG. 5 is a cross-sectional view of the brewing material holder including dynamic water dispersion according to the present invention taken along line 5-5 of FIG. 4.

A cross-sectional view of the brewing material holder 30 including dynamic water dispersion according to the present invention along line 4-4 of FIG. 3A is shown in FIG. 4 and a cross-sectional view of the brewing material holder 30 taken along line 5-5 of FIG. 4 is shown in FIG. 5. A hollow, vertical, pointed column 34 having a vertical centerline CL is rotatable attached to the cover portion 32 of the lid 31. The column 34 extends down into the base 40 and includes ports 39 (see FIG. 6B) releasing radial sprays of water 38 (see FIG. FIG. 6A) into the base 40 and into brewing material 41 in the base 40. The column 34 includes arm 35 extending radially and including ports 37 releasing tangential sprays of water 36. The tangential sprays of water 36 urge the column 34 to spin, thus providing dynamic water dispersion into the brewing material 41.

Figure 6A:
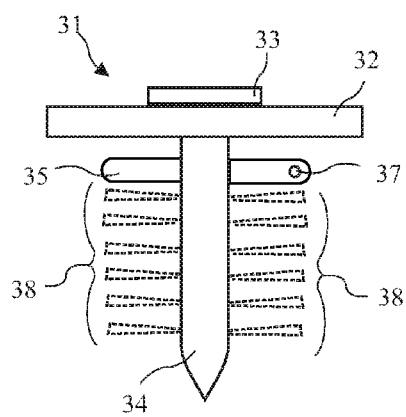
FIG. 6A is a side view of a lid assembly the brewing material holder including dynamic water dispersion according to the present invention.
Figure 6B:
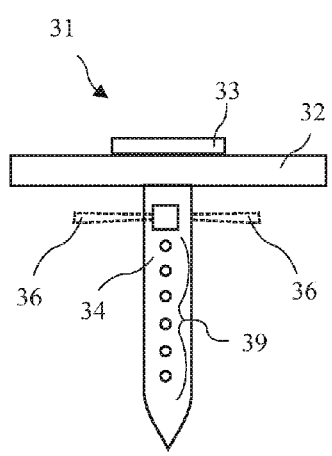
FIG. 6B is a second side view of the lid assembly the brewing material holder including dynamic water dispersion according to the present invention.

A side view of the lid assembly 31 the brewing material holder 30 is shown in FIG. 6A and a second side view of the lid assembly 31 rotated 90 degrees is shown in FIG. 6B.

Figure 7:
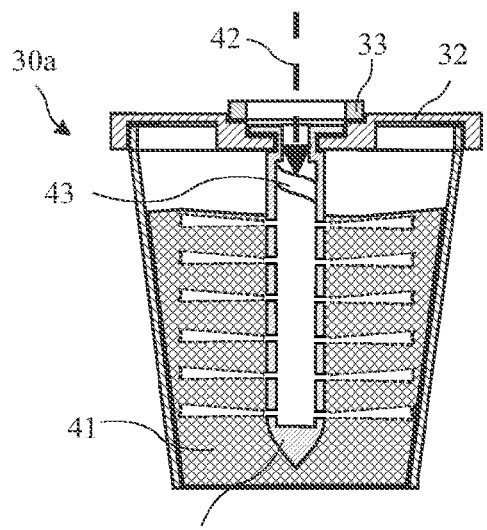
FIG. 7 shows a cross-sectional view of a second brewing material holder including dynamic water dispersion according to the present invention having internal propeller elements.

A cross-sectional view of a second brewing material holder 30a including dynamic water dispersion having internal propeller elements 43 is shown in FIG. 7. The water flow 42 through the internal propeller elements 43 causes the column 34a to spin, thus providing dynamic water dispersion into the brewing material 41. The second brewing material holder 30a is otherwise similar to the brewing material holder 30.

Figure 8:
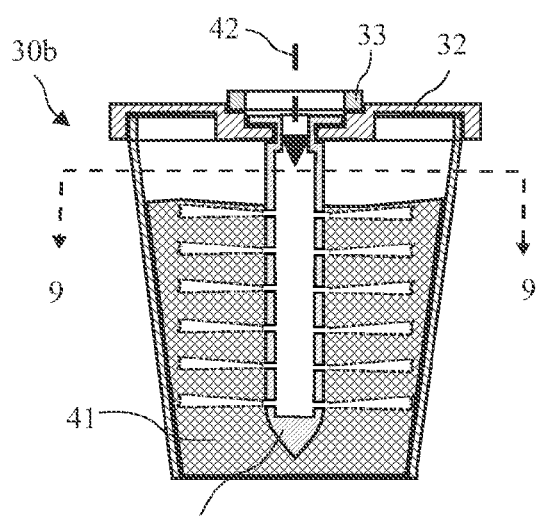
FIG. 8 shows a cross-sectional view of a third brewing material holder including dynamic water dispersion according to the present invention having tangentially directed sprays.
Figure 9:
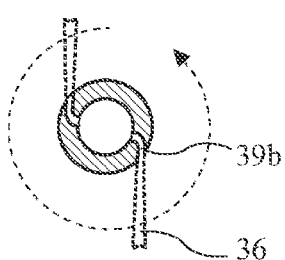
FIG. 9 is a cross-sectional view of the third brewing material holder including dynamic water dispersion according to the present invention taken along line 9-9 of FIG. 8.

A cross-sectional view of a third brewing material holder 30b including dynamic water dispersion and having tangentially directed sprays is shown in FIG. 8 and a cross-sectional view of the third brewing material holder 30b taken along line 9-9 of FIG. 8 is shown in FIG. 9. The ports 39b direct the flows 36 tangentially to rotate a second hollow, vertical, rotating column 34b which does not include the arms 35. The third brewing material holder 30b is otherwise similar to the brewing material holder 30.

Figure 10:
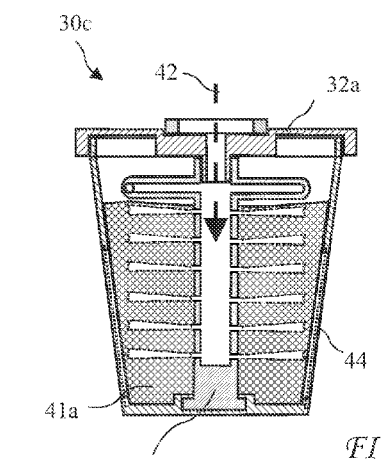
FIG. 10 shows a cross-sectional view of a fourth brewing material holder including dynamic water dispersion according to the present invention having a center column rotatably carried by a holder base.

A cross-sectional view of a fourth brewing material holder 30c including dynamic water dispersion and having a third hollow, vertical, rotating column 34c rotatably carried by a holder base 41a is shown in FIG. 10. A lid 32a guides the water flow 42 into the center column 34c. Mesh material 44 in walls of the base 41a allows brewed drink to escape from the holder 30c. The fourth brewing material holder 30c is otherwise similar to the brewing material holder 30.

Figure 11:
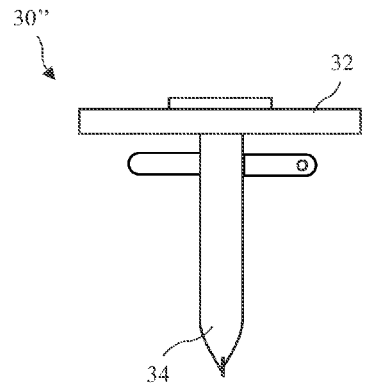
FIG. 11 shows an exploded view of a holder with mesh material in walls of the base to retain brewing material.
Figure 11:
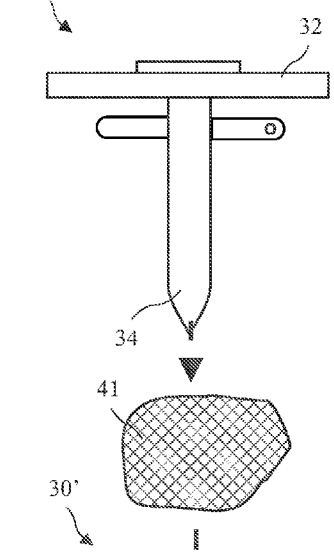
Figure 12:
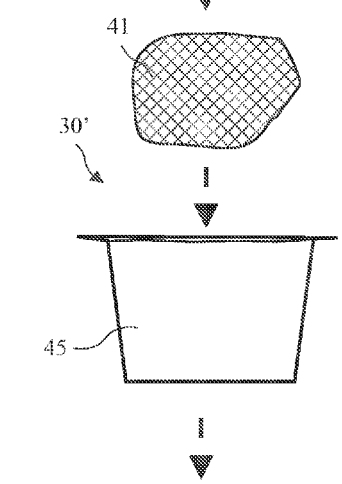
FIG. 12 shows an exploded view of a holder with a filter paper cup inserted into the base to retain brewing material.
Figure 12:
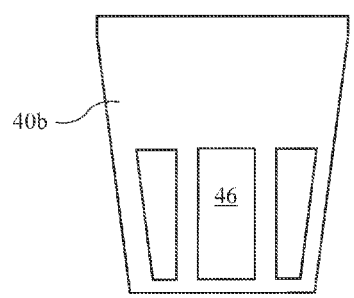

An exploded view of a holder with mesh material 44 in walls of a base 40a to retain brewing material 41 is shown in FIG. 11. This embodiment may be used with the column 34 attached to the lid or to the base.

An exploded view of a holder with a filter paper cup 45 inserted into the base 40b to retain brewing material 41. Windows 46 are provided in the walls and/or bottom of the base 40b to allow the brewed drink to escape. The column 34 is preferably attached to the lid 32 in this embodiment because a column attached to the base may interfere with the filter paper cup 45.

Figure 13:
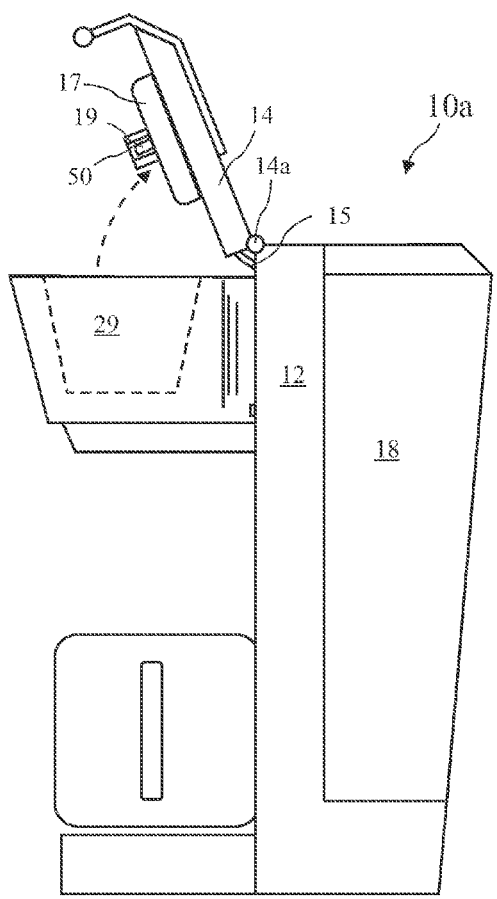
FIG. 13 shows a coffee maker including a rotating shaft engaging a brewing material holder according to the present invention.
Figure 14:
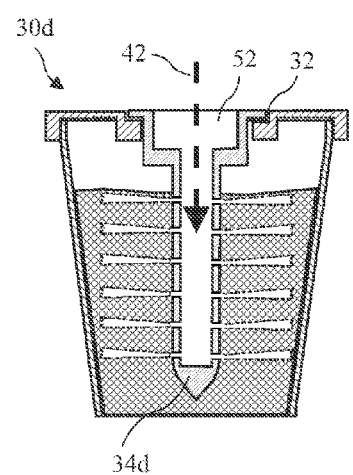
FIG. 14 shows a cross-sectional view of a fifth brewing material holder including dynamic water dispersion according to the present invention having a center column rotated by the coffee maker.

A coffee maker 10a including a rotating shaft 50 engaging a fifth brewing material holder 30d is shown in FIG. 13 and a cross-sectional view of the holder 30d having a fourth hollow, vertical, rotating column 34d rotated by the rotating shaft 50 engaging a driven portion 52 is shown in FIG. 14.

Figure 15:
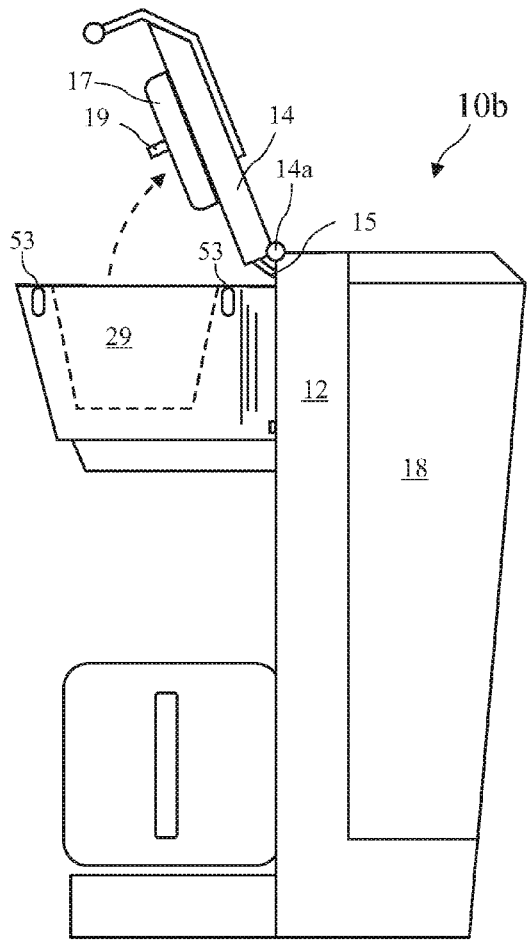
FIG. 15 shows a coffee maker including stator windings creating a rotating stator field in a brewing material holder according to the present invention.
Figure 16:
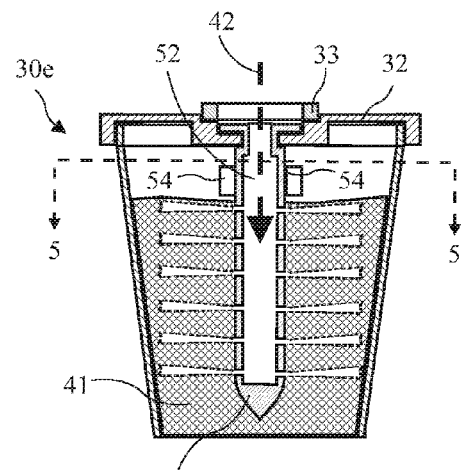
FIG. 16 shows a cross-sectional view of a sixth brewing material holder including dynamic water dispersion according to the present invention having magnets rotated by the rotating stator field created by the coffee maker.

A coffee maker 10b including stator windings 53 creating a rotating stator magnetic field in a sixth brewing material holder 30e is shown in FIG. 15 and a cross-sectional view of the holder 30e including dynamic water dispersion includes magnets or squirrel cage elements 54 attached to the driven portion 52 rotating a fifth hollow, vertical, rotating column 34e and rotated by the rotating stator field created by the coffee maker 10b is shown in FIG. 16.

A coffee maker 10c including an offset rotating shaft 56 engaging a seventh brewing material holder 30f including dynamic water dispersion is shown in FIG. 17 and a cross-sectional view of the brewing material holder 30f having an offset shaft 57 engaging the offset shaft 56, and a drive member 58 and driven member 59 attached to the driven portion 52 rotating a sixth hollow, vertical, rotating 34f is shown in FIG. 18. The offset shafts avoid the nozzle 19 and passage 47. The driver member 58 and driven member 59 may be gears, rollers, a belt and hubs, or the like.

Figure 19:
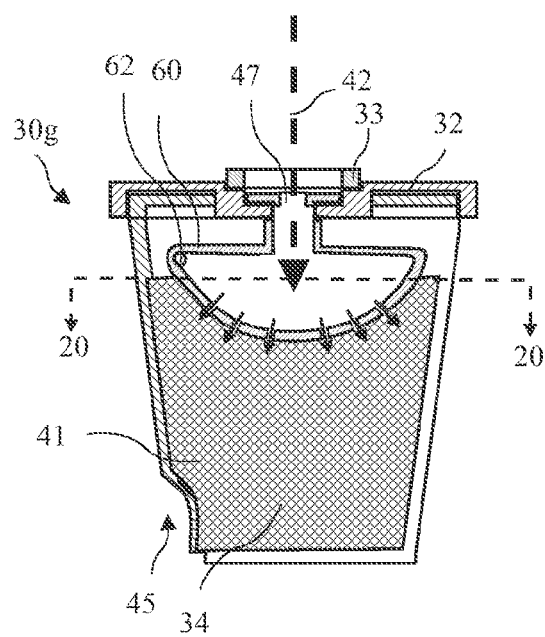
FIG. 19 shows a cross-sectional view of an eighth brewing material holder including dynamic water dispersion according to the present invention having a dome according to the present invention for dispersing water.
Figure 20:
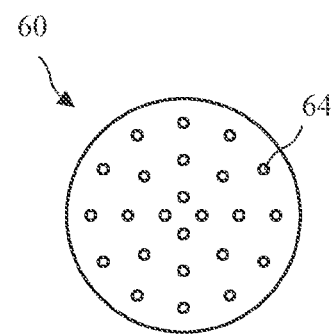
FIG. 20 is a cross-sectional view of the dome according to the present invention taken along line 20-20 of FIG. 19.

A cross-sectional view of an eighth brewing material holder 30g including dynamic water dispersion having a dome 60 for dispersing water is shown in FIG. 19 and a cross-sectional view of the dome 60 taken along line 20-20 of FIG. 19 is shown in FIG. 20. The dome 60 may be rotated by offset tangential sprays from ports 62 similar to sprays 36 (see FIG. 5), or the dome 60 may be rotated by any of the means shown for brewing material holders 30a-30f. The dome 60 includes at least one dispersion port 64, and preferably a multiplicity of dispersion ports 64.

Figure 21:
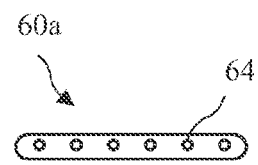
FIG. 21 is a cross-sectional view of a one dimensional dome according to the present invention taken along line 20-20 of FIG. 19.

An alternative one dimensional dome 60a is shown in FIG. 21 having a single row of dispersion ports 64. The one dimensional dome 60a may be rotated by any of the methods shown for brewing material holders 30a-30f to provide dynamic water dispersion into the brewing material.

While the invention herein disclosed has been described by means of specific embodiments and applications thereof, numerous modifications and variations could be made thereto by those skilled in the art without departing from the scope of the invention set forth in the claims.

We claim:

1. A brewing material holder for use with a brewer to prepare a brewed beverage, comprising:
   a reusable holder base having an interior configured to hold brewing material;
   a reusable holder lid attachable to and removable from the reusable holder base;
   a water inlet deposed in the reusable holder lid, alignable with a brewer nozzle of the brewer to receive a water flow from the brewer;
   a vertically extending, hollow, rotating dispersing member attached to a cover portion of the reusable holder lid having a vertical centerline (CL) generally co-axial with the brewing nozzle and residing inside the reusable holder base and having vertically spaced apart ports defining passages through the rotating dispersing member in fluid communication with the water inlet for releasing radial sprays of water into the brewing material; and wherein the brewing material holder is sized to be insertable into the brewer to prepare the brewed beverage and removable from the brewer for cleaning and re-use.

2. The brewing material holder of claim 1, wherein the rotating dispersing member is a hollow, vertical, rotating column, the rotating column further including at least two opposing arms extending radially from the rotating column proximal to the reusable holder lid, each arm including a tangential port in fluid communication with the water flow and producing tangential sprays to rotate the rotating column.

3. The brewing material holder of claim 2, wherein the hollow, vertical, rotating column is rotatably attached to the reusable holder lid and includes a pointed end opposite to the reusable holder lid to facilitate pressing into brewing material in the reusable holder base.

4. The brewing material holder of claim 2, wherein the rotating column is rotatably attached to the reusable holder base and engages the reusable holder lid to receive the water flow.

5. The brewing material holder of claim 1, wherein the rotating dispersing member is a hollow, vertical, rotating column including the vertically spaced apart ports in fluid communication with the water flow and producing tangential sprays to rotate the rotating column.

6. The brewing material holder of claim 5, wherein the rotating column is rotatably attached to the reusable holder lid and includes a pointed end opposite to the reusable holder lid to facilitate pressing into brewing material in the reusable holder base.

7. The brewing material holder of claim 5, wherein the rotating column is rotatably attached to the reusable holder base and engages the reusable holder lid to receive the water flow.

8. The brewing material holder of claim 1, wherein the rotating dispersing member further including a driven upper portion rotatably attached to the reusable holder lid and co-axial with the brewer nozzle and rotated by the brewer.

9. The brewing material holder of claim 8, wherein: the brewing material holder is configured to cooperate with a brewing chamber lid of the brewer including an offset rotating member offset from the brewer nozzle and facing into the brewing material holder; the reusable holder lid further includes an offset driver member engageable with the offset rotating member; and the driven upper portion cooperating with the offset driver member to rotate the rotating dispersing member.

10. The brewing material holder of claim 8, wherein: the brewing material holder is configured to be in a brewing chamber surrounded by stator windings; and wherein magnets are attached to the driven upper portion, the magnets cooperating with a rotating stator magnetic field to rotate the rotating dispersing member.

11. The brewing material holder of claim 8 wherein: the brewing material holder is configured to reside in a brewing chamber surrounded by stator windings; and wherein a squirrel cage is attached to the driven upper portion, the squirrel cage configured to cooperate with a rotating stator magnetic field to rotate the rotating dispersing member.

12. The brewing material holder of claim 8, wherein brewing material holder is configured to cooperate with a brewing chamber lid including a centered rotating shaft generally co-axial with the rotating dispensing member and engagable with the driven upper portion to rotate the rotating dispensing member.

13. The brewing material holder of claim 8, wherein the rotating dispensing member is rotated by a motor in the brewer.

14. The brewing material holder of claim 1, wherein the vertically spaced apart ports comprise opposing pairs of the vertically spaced apart ports producing opposing radial sprays.

15. The brewing material holder of claim 1, wherein the rotating dispersing member is a hollow, vertical, rotating column including the vertically spaced apart ports in fluid communication with the water flow and producing sprays into the brewing material, the rotating column including internal propeller elements to rotate the column when the water flow flows past the internal propeller elements.

16. The brewing material holder of claim 1, wherein the rotating dispersing member is vertically fixed with respect to the reusable brewing material holder lid.

17. A coffee maker, comprising:
a reusable brewing material holder;
a brewing chamber configured to hold the brewing material holder during brewing;
a brewing chamber lid closeable to contain the brewing material holder in the brewing chamber, and including a motor driven centered rotating shaft configured to extend into the brewing chamber and a brewer nozzle extending down from a brewing chamber lid;
the reusable brewing material holder comprising:
a reusable brewing material holder base having an interior configured to hold brewing material;
a removable reusable brewing material holder lid attachable to and detachable from the reusable brewing material holder base;
a water inlet deposed in the reusable brewing material holder lid alignable with the brewer nozzle, the water inlet configured to receive a water flow from the coffee maker through the brewer nozzle;
a rotating dispensing member comprising:
a rotating driven upper portion rotatably attached to the reusable brewing material holder lid and co-axial with the brewer nozzle and engagable with the rotating shaft to rotate the rotating dispensing member; and
a rotating column extending down into the reusable brewing material holder base from the rotating driven upper portion and wherein the rotating column includes a plurality of vertically spaced apart ports in fluid communication with the water flow for releasing radial sprays of water into the brewing material, the rotating column rotationally fixed attached to the driven upper portion to rotate the rotating column and wherein the brewing material holder is sized to be insertable into the coffee maker to prepare a brewed beverage and removable from the coffee maker for cleaning and re-use.

18. The brewing material holder of claim 17, wherein the rotating column is generally co-axial with the rotating shaft.

19. The brewing material holder of claim 18, wherein the rotating shaft engages the driven upper portion when the brewing chamber lid is closed, and is disengaged from the upper driven portion when the brewing chamber lid is opened.

20. A reusable brewing material holder for use with a coffee marker to prepare a brewed beverage, comprising:
a reusable brewing material holder base having an interior configured to hold brewing material;
a reusable brewing material holder lid attachable to and detachable from the reusable brewing material holder base;
a water inlet deposed in the reusable brewing material holder lid alignable with a brewer nozzle attached to a brewing chamber lid of the coffee maker, the water inlet configured to receive a water flow from the coffee maker through the brewer nozzle;
a rotating dispensing member comprising a rotating driven upper portion rotatably attached to the reusable brewing material holder lid and generally co-axial and engagable with a rotating shaft carried by the brewing chamber lid to rotate the rotating dispensing member and
a rotating column generally co-axial with the brewer nozzle and vertically extending down into the reusable brewing material holder base from the driven upper portion and wherein the rotating column includes a plurality of vertically spaced apart ports in fluid communication with the water flow for releasing radial sprays of water into the brewing material, the rotating column rotationally fixed to the driven upper portion to rotate the rotating column and wherein the brewing material holder is sized to be insertable into the coffee maker to prepare a brewed beverage and removable from the coffee maker for cleaning and re-use.

* * * * *